July 19, 1938.  T. R. LYMAN  2,124,467

AUTOMATIC COUPLING DEVICE

Filed Sept. 18, 1937

Inventor

THEODORE R. LYMAN,

By Kimmel & Crowell,

Attorneys

Patented July 19, 1938

2,124,467

UNITED STATES PATENT OFFICE 2,124,467

AUTOMATIC COUPLING DEVICE

Theodore R. Lyman, Great Falls, Mont., assignor of thirty-five percent to Julius J. Wuerthner, Great Falls, Mont.

Application September 18, 1937, Serial No. 164,567

6 Claims. (Cl. 280—33.15)

This invention relates to automatic coupling devices for tractors and more particularly for use in connection with tractors where a helper tractor is used.

One object of this invention is to provide a tractor coupling for use where two tractors are used together. Another object is to provide a coupling device especially adapted for use on steep grades. Another object is to provide a coupling which is automatic and flexible. A further object is to provide a coupling device which is readily adaptable to various types of tractors. Another object is to provide a coupling device which is capable of operating when directed at an appreciable angle to the other member of the coupling. Another object is to provide a coupling which may be used without stopping the tractors while in use. A further object is to provide a coupler which can be operated by the operator of the tractor alone. Other objects and advantages of this invention will be ascertained by reading the following description in connection with the accompanying drawing.

In the drawing wherein like numerals indicate corresponding parts in the various figures, Fig. 1 is a top plan partly in section of a coupler incorporating the features of this invention. Fig. 2 is a side elevation taken on the line 2—2 in Fig. 1 and partly broken away to show the internal construction of the device. Fig. 3 is a transverse section on line C—C of Fig. 1.

I have attained the foregoing objects by constructing an automatic tractor coupling having a pair of pivoted coupler jaws, means for securing the jaws to a vehicle, means for yieldably holding said jaws together, and means for locking the jaws in disengaged position.

Considering the drawing in greater detail, the device is shown as comprising a clevis member 10, a pair of coupler jaws 11 and 12, the latter having a channel section portion the flanges being 12' and 12" for receiving the jaw 11, yieldable means 13 urging the jaws together, and a latch 14 for locking the jaws in separated position.

The clevis member 10 is provided with a bifurcated portion forming two arms 15 and 16 each of which is provided with a bore hole 17 for securing the device to a tractor. The opposite end of the clevis is provided with an appropriate bore hole 18 for providing the pivoted connection between the jaws and the clevis. The parts are pivotally secured together by the pin 19 which is locked in place by the cotter pins 20 and 21.

The jaws are each provided with counter-bore portions 22 and 23 which are opposed to each other and in which is fastened the yieldable means 13. The yieldable means comprises a strong spring member which is secured to each of the jaws by means of the fastening devices 25 and 26 which latter engage the extending portions 27 and 28 of the spring. This spring normally holds the jaws together.

The jaws are provided with a pair of cam surfaces 30 and 31 which are arranged to be engaged by the head 32 of the draw bar 33 of the helped tractor. As the head of the draw bar engages the cam surface 30, the jaws of the coupling are forced apart to a position intermediate the full line and dotted line positions in Fig. 1. The head 32 of the draw bar then slips by the cam surfaces and the flange 34 is immediately gripped between the jaws, by the abutment 35 interposed between the cam surfaces and having a flat wall extending transversely of the longitudinal direction of the coupling. This latching or engaging of the coupling with the draw bar can be accomplished without stopping the tractor. The helper tractor can get ahead of the tractor to be helped and after getting in position can slow down so that the two tractors while still moving forwardly will move relatively to each other so that they in effect approach each other. The draw bar on the trailing tractor will abut against the cam surface 30 on the leading tractor and will force the jaws apart allowing the drawbar to enter the coupling and be gripped therein. As soon as the coupling is engaged, the leading tractor can be speeded up so as to assist in pulling the load.

After the load has been moved to an appropriate point on a steep grade or beyond the obstacle which was interfering with the transportation of the load, the leading tractor can again be slowed down thereby allowing the head of the draw bar to engage the cam surface 31. The trailing tractor will again separate the coupling members. The coupling will then be in the dotted line position 36 as viewed in Fig. 1 with the draw bar head 32 assuming the dotted position 32'. With the coupling in this position the means for latching the coupling is disengaged position may be actuated, by the vehicle operator, to hold the jaws apart to allow the coupling to be disengaged.

For the purpose of accomplishing this latching in disengaged position, a latch 14 is mounted upon one of the coupler jaws. Coupler jaw 11 has a main bearing boss 37 and auxiliary bearing bosses 38 and 39. An operating lever 40 extends through the bearings to support the latch 14. The upper end of the lever 40 has an operating arm 41 and the lower end is locked in place by the cotter pin 42. The member 14 comprises a latch portion 43 which is substantially frusto triangular in vertical elevation, and bearing portions 44 and 45 which are provided with counter-bores 46 and 47. The rod 40 passes through the bosses on the latch member 11 and the bearing portions of the latch, thereby locating the latch pivotally upon the jaw 11. The latch is retained in the full line position in Fig. 1 by means of the spring 47′ which has one end 48 engaging the boss 39 and the other end 49 engaging the latch. When the coupling members are in the dotted line position of Fig. 1 the operator of the leading tractor can readily move the lever arm to the dotted position 41′ thereby swinging the latch into the dotted position 43′. The jaw 11 is provided with an under-cut portion 50 to serve as a pocket for the latch when it is in its normal position. The jaw 12 is provided with the undercut part 51 which terminates in the arcuate portion 52 which latter serves as a limit stop for the latch member as indicated by the lines 52′.

The coupling can be operated by power as a result of the relative approach movement between the two tractors to thereby eliminate the need of the operator overcoming the forces of the heavy spring 13. It is a relatively minor task for the operator to move the lever 41 against the action of the relatively light spring 47 to latch the jaws apart so that the draw bar of the trailing tractor may be withdrawn from the coupling.

Abutments 53 serve to limit the approach motion of the jaws. The flat surfaces 54 define the limiting sizes of draw bar heads that may be engaged by the coupler. They also provide the connecting surfaces between the abutments 35 and the cam surfaces 31.

Although a preferred embodiment of this invention is shown and described, variations coming within the true spirit and scope of the same are to be determined by the appended claims.

What I claim is:

1. An automatic coupling member including a pair of coupler jaws, each jaw having centrally of its forward end a counterbore to receive a spring yieldingly holding said jaws together, the inner walls of said counterbore forming an approximately triangular space just back of said spring, one jaw having a main bearing boss therein and spaced auxiliary bosses, a shaft projecting through and being journaled in said bosses, a latch attached to said shaft, a spring bearing against the latch to retain it in position, a laterally projecting handle at one end of the shaft, the opposite jaw being formed with an undercut portion to receive said latch when in holding position, said undercut terminating in an arcuate portion forming a stop therefor, the jaws provided internally with a pair of cam surfaces terminating in an approximately right angular abutment to receive and hold a cooperating member, another pair of cam surfaces forward of the first named cams and having mutually contacting surfaces at the front ends thereof, said latch being operable to hold the jaws in extended positions.

2. An automatic coupling member including a pair of coupler jaws, each jaw having centrally of its forward end a counterbore to receive a spring yieldingly holding said jaws together, the walls forming an approximately triangular space just back of said spring, one jaw having a main bearing boss therein, a shaft projecting through and being journaled in said boss, a latch attached to said shaft, a laterally projecting handle at one end of the shaft, the opposite jaw being formed with an undercut portion to receive said latch when in holding position, said undercut terminating in an arcuate portion forming a stop therefor, the jaws provided internally with a pair of cam surfaces terminating in approximately a right angular abutment to receive and hold a cooperating member, another pair of cam surfaces forward of the first named cams and having mutually contacting surfaces at the front ends thereof, said latch being operable to hold the jaws in extended positions.

3. An automatic coupling member including a pair of coupler jaws, each jaw having centrally of its forward end a counterbore opening interiorly and exteriorly to receive a spring yieldingly holding said jaws together, the walls forming an approximately triangular space just back of said spring, one jaw having a bearing, a shaft projecting through and being journaled in said bearing, a latch attached to said shaft, a laterally projecting handle at one end of the shaft, the opposite jaw being formed with an undercut portion to receive said latch when in holding position, said undercut terminating in an arcuate portion forming a stop therefor, the jaws provided internally with a pair of cam surfaces terminating in approximately a right angular abutment to receive and hold a cooperating member, another pair of cam surfaces forward of the first named cams and having mutually contacting surfaces at the front ends thereof, said latch being operable to hold the jaws in extended positions.

4. An automatic coupling member including a pair of coupler jaws, each jaw having centrally of its forward end a counterbore opening interiorly and exteriorly to receive a spring yieldingly holding said jaws together, the walls forming an approximately triangular space just back of said spring, one jaw having a bearing, a shaft projecting through and being journaled in said bearing a spring for said shaft, a handle for the shaft, the opposite jaw being formed with a stop therefor, the jaws provided internally with a pair of cam surfaces terminating in approximately a right angular abutment to receive and hold a cooperating member, another pair of cam surfaces forward of the first named cams and having mutually contacting surfaces at the front ends thereof and forming a protector for the latch, said latch being operable to hold the jaws in extended positions.

5. An automatic coupling member including a pair of coupler jaws, each jaw having centrally of its forward end a counterbore opening interiorly and exteriorly to receive a spring yieldingly holding said jaws together, the walls forming an approximately triangular space just back of said spring, one jaw having a main bearing boss therein, a shaft projecting through and being journaled in said boss, a latch and handle attached to said shaft, the opposite jaw being formed with an undercut terminating in an arcuate portion forming a stop therefor, the jaws provided internally with a pair of cam surfaces terminating in approximately a right angular abutment to receive and hold a cooperating member, another pair of cam surfaces forward of the first named cams and terminating in mutually contacting protective abutments between the cam and the latch.

6. An automatic coupling member including a pair of coupler jaws, each jaw having centrally of its forward end a counterbore to receive a spring yieldingly holding said jaws together, the inner walls forming an approximately triangular space just back of said spring, one jaw having a main bearing boss therein and spaced auxiliary bosses, a shaft projecting through and being journaled in said bosses, a latch attached to said shaft, a stop therefor, the jaws provided internally with a pair of cam surfaces terminating in an approximately right angular abutment to receive and hold a cooperating member, another pair of cam surfaces forward of the first named cams and having mutually contacting surfaces at the front ends thereof, said latch being operable to hold the jaws in extended positions.

THEODORE R. LYMAN.